Jan. 2, 1962 — D. C. KALBFELL — 3,015,801
DRILL PIPE MODULE DATA COLLECTION AND TRANSMISSION SYSTEM
Filed June 16, 1959 — 3 Sheets-Sheet 1

INVENTOR.
D.C. KALBFELL
BY George E. Pearson
ATTORNEY

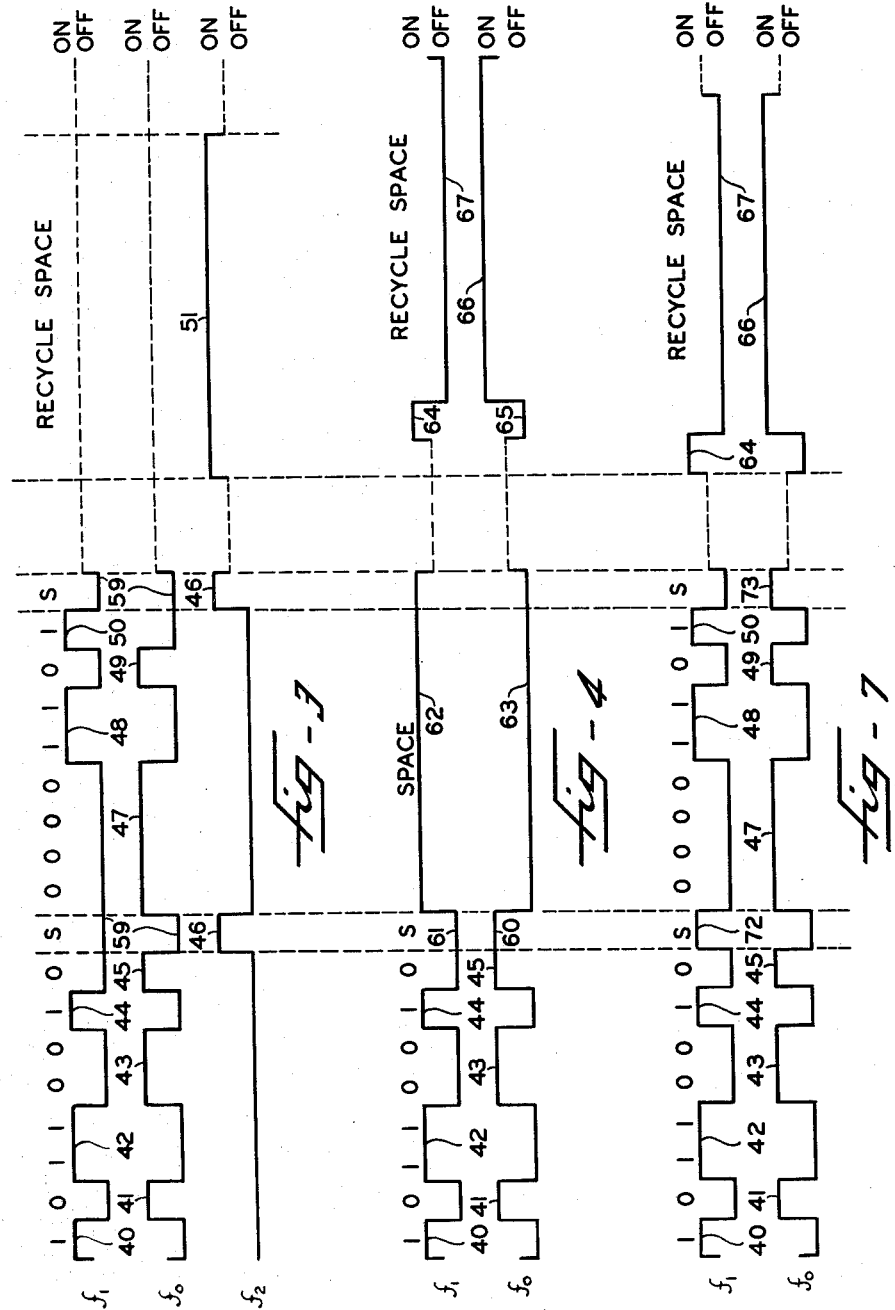

Jan. 2, 1962    D. C. KALBFELL    3,015,801
DRILL PIPE MODULE DATA COLLECTION AND TRANSMISSION SYSTEM
Filed June 16, 1959    3 Sheets-Sheet 3

INVENTOR.
D.C. KALBFELL
BY
George E. Pearson
ATTORNEY

United States Patent Office
3,015,801
Patented Jan. 2, 1962

3,015,801
DRILL PIPE MODULE DATA COLLECTION AND TRANSMISSION SYSTEM
David C. Kalbfell, 941 Rosecrans St., San Diego 6, Calif.
Filed June 16, 1959, Ser. No. 820,680
22 Claims. (Cl. 340—18)

This invention relates generally to the art of data collection and transmission and, more particularly, to a drill pipe module data collection and transmission system and method for sensing a plurality of parameters of interest in an oil well concurrently with the drilling operation therein, and acoustically transmitting signals indicative of the magnitude of the sensed parameters via the drill pipe in a form suitable for detection and recording at the surface.

In well logging, it is customary to measure electrical conductivity, the velocity of sound, and the intensity of nuclear radiation of the earth formation; and, as a result of long experience, it is possible to interpret these measurements to determine whether or not a valuable oil producing stratum has been encountered. Heretofore, in order to make such measurements, it has been necessary to remove the drill pipe from the well and insert a measuring capsule which transmits the measured information up to the surface through wires. Such logging operations, however, are slow, time consuming, expensive, and incapable of yielding sufficient information; and the information is received too late to be useful in guiding the drilling operation.

Continuous logging, while drilling, has been proposed but has not been found to be successful, particularly in deep wells. In accordance with one such proposal, for example, the measured parameter is converted into a variable frequency signal for exciting a transducer which, in turn, transmits acoustic signals via the drill pipe to the surface. This and other applications of airborne telemetry techniques have not been found to be satisfactory in service for the reason that acoustical transmission of intelligence through a pipe or through the earth from great depths is difficult in view of the high attenuation at high frequencies, the small amount of transmitting power available from batteries in the drill pipe, and the high noise level at the surface of the earth due to the drilling machinery.

These and other difficulties encountered in the well logging systems heretofore used or proposed have been obviated in the novel pulse code modulation type of logging system disclosed generally herein. The drill pipe module data collection and transmission system of the present invention, although not limited thereto, finds particular application and use in combination with other components of the novel logging system aforesaid, these being drill pipe module transponder units, transducer receivers, and a narrow band correlation type receiver.

In accordance with the data collection and transmission system of the present invention, a series of commutated analog signals corresponding to the measured parameters are repetitively transmitted via the drill pipe in frequency modulation or binary number form by means of frequency shift keying in a three frequency system in which frequencies $f_1$ and $f_0$ respectively correspond to the "1" and "0" digit signals and a frequency $f_2$ provides a "space" transmittal between each series of the binary digits forming a binary number and a longer "space" transmittal between each series of transmitted binary numbers to thus indicate at the receiver completion of each cycle of analog voltage measurements. Instead of a long pulse at frequency $f_2$ to indicate recycling, a short pulse at a new frequency $f_3$ could be used.

Alternatively, the frequency shift keying may be accomplished in a two frequency system without resorting to "space" transmittals; or, either or both of the frequencies may be made to serve additionally for "space" transmittals.

A magnetic or electronic commutator is employed to increase the number of parameters being measured whereby hole temperature, pressure, mechanical resistance offered by the formation to the drill bit and other parameters may be measured in addition to those customarily measured, as aforementioned.

A signal generator produces the carrier frequencies $f_1$ and $f_0$ by heterodyning frequency $f_2$ with a basic clock frequency $f_c$. Frequency $f_c$ also serves to provide shift pulses required in the analog to digital conversion, commutation, and frequency shift keying.

Coherence is maintained between signal frequencies $f_0$, $f_1$ and clock signal frequency $f_c$ so that the clock frequency may be reconstructed at the receiver by heterodyning the two signal frequencies $f_0$, $f_1$, thus rendering the overall transmitter-receiver system independent of drift in the oscillators comprising the signal generator.

Signal frequencies $f_0$, $f_1$, and $f_2$ drive a nonresonant transmitter transducer of a type suitable for the purpose, such as that disclosed and claimed in my copending application for Drill Pipe Module Transmitter Transducer, Serial No. 39,633, filed June 29, 1960, and to which reference may be had for details as to construction and operation.

The sensors and associated transmitter circuitry, and the transmitter transducer are mounted in one or more modules comprising sections of drill pipe each consisting of two concentric cylinders separated about ¾ of an inch. Externally, the drill pipe modules appear similar to any other piece of drill pipe and are handled by the drilling crew in the same manner.

It is an object of the present invention to provide a data collection and transmission system and method having utility for logging-while-drilling operations in an oil well and in which a number of parameters are sensed near the drill bit in the well and signals corresponding thereto are transmitted via the drill pipe for detection and recording at the surface.

Another object in a data collection and transmission system and method of this type is to measure and sequentially sample a plurality of oil well parameters and convert the sampled measurements to binary numbers for transmission to the surface.

Another object in a binary signal transmission system and method of this type is to utilize frequency shift keying for transmission of the binary signals; and, in a manner, to provide for reconstruction at the receiver of the basic clock or shift frequency from which the transmission frequencies are derived.

Still another object is to provide a binary type data collection and transmission system and method in which a plurality of oil well parameters are sensed, sequentially sampled, converted into a series of binary numbers; each of which comprises a series of "1" and "0" bits, and transmitted to the surface in the form of two different signal frequencies representing the "1" and "0" bit values. Binary coded decimal logic might be preferable to straight binary logic.

A still further object is to provide a pulse code modulation signal transmission system and method in which a pair of frequencies employed for transmittal of digit values are derived from a basic clock pulse and a third frequency employed for "space" transmittals.

Still another object is to provide a signal transmission system adaptable for mounting in the form of a drill pipe module.

Other features, advantages and objects of the present invention will become more fully apparent as the description proceeds, reference being had to the accompanying drawings wherein:

FIGS. 3 and 4 are pulse diagrams depicting "number" and "space" transmittals produced respectively by the system of FIG. 1 and by the system of FIG. 1 as modified by the circuit arrangement of FIG. 2;

FIG. 7 is a pulse diagram generally similar to those of FIGS. 3 and 4 and depicting the "number" and "space" transmittals produced by the system of FIG. 6.

Figure 1:
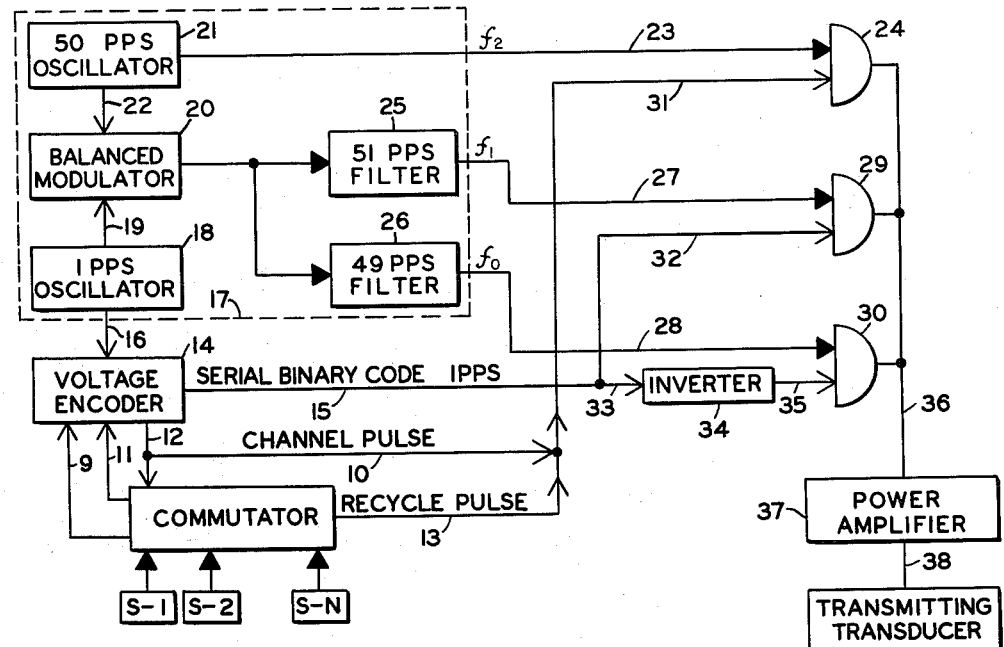
FIG. 1 illustrates in block diagram form an embodiment of the data collection and transmission system of the present invention suitable for practicing the method thereof.

Referring now to the drawings and more particularly to FIG. 1, there is shown thereon in block diagram form an electronic embodiment of the drill pipe module data collection and transmission system of the present invention which comprises a plurality of sensors designated S–1, S–2, . . . S—N, each of which, in a well known manner, is constructed and arranged to detect and measure one of a plurality of different parameters of interest in an oil well and convert the magnitude of the measured parameter to a corresponding analog potential. The sensor for measuring the mechanical resistance confronting the drill bit, for example, may comprise a pair of strain gauges located a predetermined distance apart along the drill pipe and arranged electrically in a Wheatstone bridge to produce an output voltage indicative of the drill stem torque in a well known manner. Similarly, other sensors suitable for the purpose of measuring parameters such as pressure, temperature, conductivity, and other oil well parameters of interest are well known and may be selected judiciously in accordance with mounting requirements within the drill pipe module, and like considerations.

Sensores S–1, S–2, . . . S–N are individually connected electrically to a commutator 10 for sampling the analog voltage outputs of the sensors in sequential order and for presenting the same serially on a single signal output 11, provision being made within the commutator for effecting the switching from sensor to sensor in response to shift pulses received by way of commutator input 12 and presenting on commutator output 13 a recycle shift pulse which is indicative of the completion of the sampling of all of the sensor inputs. Provision is also made for presenting on commutator output 9 an encoder starting pulse each time that a new sensor is connected for a purpose to appear more fully as the description proceeds.

For the foregoing purpose, commutator 10 may be of any suitable type and preferably is a low level magnetic commutator such as that manufactured by the San Diego Scientific Corp., San Diego 10, California. A magnetic commutator of this type is disclosed and claimed in my copending application for Magnetic Commutator and Measuring Apparatus, Serial No. 652,969, filed April 15, 1957, now Patent No. 2,978,694, to which reference may be had for further details of construction and operation.

It suffices to state herein that the magnetic commutator is generally constructed and arranged to sample the output voltages of low level sources such as thermocouples, strain gauges, and the like, without the use of pre-amplifiers and may handle several thousand sensor transducers in a single system with a speed equal to that of a high speed voltage encoder with which it may be cooperatively associated as in the signal transmission system of the present invention. Solid state circuitry is used in the magnetic commutator under conservative operating conditions to give virtually unlimited life. The magnetic commutator is thus particularly well suited for use in the drill pipe module signal transmission system of the present invention in view of its compactness, multi-channel input, and the small amount of power required for its operation within the drill pipe.

In the use of such a magnetic commutator in the system of the present invention, the sensor transducers S–1, S–2, . . . S–N are connected respectively in a plurality of input channels each to a subminiature magnetic amplifier having low noise, high gain, and a high degree of stability against drift. Each magnetic amplifier comprises input, feedback, carrier, and output windings, and commutation is accomplished by switching carrier power to the carrier windings in sequential order, one magnetic amplifier at a time, the signal circuits to the input windings being uninterrupted to thus eliminate contact potentials. An output voltage is developed only in the output winding of the magnetic amplifier whose carrier winding is receiving current, the voltage outputs in the output windings of all of the other amplifiers being zero. The output windings are connected together either in series or in parallel to thus present the sampled output voltages serially on a single output for amplification and detection in a feedback stabilized detector amplifier which provides the final output voltage from the magnetic commutator, this output voltage being applied as feedback to the feedback windings of the magnetic amplifiers thereby to provide a major feedback loop which insures overall linearity and accuracy in the magnetic commutator.

Carrier power is switched from carrier winding to carrier winding under control of a carrier switching matrix which is adapted to be driven by shift pulses appearing on commutator input 12. The carrier switching matrix provides a series of carrier gate control pulses which are also supplied to commutator output 9, these pulses being equal in number to the number of carrier windings, and a final recycle pulse which is supplied to commutator output 13, as aforementioned. For this purpose the carrier switching matrix comprises any suitable circuitry such as ring counters and gates or binary counters with logical gates.

The series of analog voltages appearing on commutator output 11 are applied to encoder 14 which, in response to the appearance of the aforementioned starting pulses on line 9, serves to convert each of these voltages, one at at a time, into digital form comprising a series of "1" and "0" bits. The bits "1" and "0" appear on the encoder output 15 as positive and negative pulses respectively and form a binary number or code whose value corresponds to the magnitude of the analog voltage corresponding thereto. It will be recalled that line 9 transmits a starting pulse to the voltage encoder concurrently with the switching of each sensor to the commutator, this being for the purpose of starting the encoding process. After cycling through all N of the sensors, the switching matrix in the commutator moves to its last position to emit the recycle shift pulse at output 13. While the recycle shift pulse is being emitted, there is no sensor connected to the commutator, and the voltage encoder is thus inactive since a starting pulse does not appear at output 9. It will be appreciated that were the encoder to be active during the period of the recycle pulse, the absence of voltage on line 11 would be equivalent to zero voltage thereon and would result in the appearance on encoder output 15 of a series of "0" bit pulses which, as will later appear, would initiate undesired "number" transmittals concurrently with the desired recycle "space" transmittal.

Voltage encoder 14 may be of any well known type suitable for the purpose such, for example, as the digital voltmeters manufactured by Epsco, Inc., and Packard Bell Co., these being generally similar to the converter described in my aforementioned copending application, Serial No. 652,969 to which reference may be had for further details as to circuitry and manner of operation. Suffice it to state herein that the encoder comprises a switching matrix adapted to be driven by a clock signal frequency $f_c$ which is supplied by way of encoder input 16 from a signal generator generally designated 17. The encoder switching matrix comprises suitable circuitry such as a ring counter or a shift register constructed and arranged to provide on encoder output 15, an 8 bit binary serial code, for example, and to provide on commutator input 12 a final or 9th shift pulse for driving the carrier shifting matrix to effect the commutating function of commutator 10. This pulse also serves as a channel shift pulse for control of the channel "space" transmittals, as will more fully appear hereinafter.

Signal generator 17 comprises an oscillator 18 which operates at the clock signal frequency $f_c$ and supplies pulses at the rate of one pulse per second (1 p.p.s.), for example, to the encoder input 16 and also to input 19 of a balanced modulator 20. An oscillator 21 provides a center frequency $f_2$ at a rate of 50 pulses per second (50 p.p.s.), for example, and supplies these pulses to input 22 of modulator 20 and also to the steady state input 23 of an "AND" gate 24. The pulses from oscillators 18 and 21 are heterodyned by the balanced modulator 20 to provide sum and difference frequencies $f_1$ and $f_0$ which are extracted by filters 25 and 26 respectively and appear on steady state inputs 27 and 28 of "AND" gates 29 and 30. In the assumed examples of clock and center frequencies $f_c$ and $f_2$ of 1 p.p.s. and 50 p.p.s. respectively, frequencies $f_1$ and $f_0$ accordingly are supplied at 51 p.p.s. and 49 p.p.s. respectively.

The pulsed input 31 of gate 24 is connected to voltage encoder output 12 and also to commutator output 13 and thus receives the channel shift pulses and the recycle shift pulses respectively appearing thereon. Pulsed input 32 of gate 29 is connected to encoder output 15 and thus receives the series of pulses constituting the binary code. These pulses are also supplied to the input 33 of an inverter 34 which functions to produce on pulsed input 35 of gate 30 a positive output pulse for each negative "0" bit signal pulse appearing on encoder output 15.

The outputs of gates 24, 29 and 30 are connected together in the equivalent of an "OR" gate such that frequencies $f_0$, $f_1$ and $f_2$, when passed by their respective gates, are applied to the input 36 of a power amplifier 37 whose output 38 is electrically coupled to the transmitting transducer pipe module 39 which, as aforedescribed, comprises a non-resonant magnetostrictive transducer for transmitting frequencies $f_0$, $f_1$ and $f_2$ via the drill pipe to receiving means located at the surface.

When the clock frequency $f_c$ is taken to be one pulse per second as in the assumed example, each of the binary bits "1" and "0" persists for one second and each binary number in the assumed example of 8 bits persists for 8 seconds. The 9th pulse from the encoder matrix appearing on commutator input 12 also persists for one second and occurs every nine seconds. Thus, the pulses from the commutator matrix for controlling application of carrier power to the carrier windings of the magnetic amplifiers each persists for 9 seconds. Likewise, the final pulse or recycle shift pulse supplied by the commutator matrix to commutator output 13 persists for 9 seconds.

When FIG. 1 is constructed and arranged as aforedescribed, frequencies $f_1$, $f_0$ and $f_2$ appear at the transmitter transducer input 38 in the form illustrated in FIG. 3 wherein the pulse diagram depicts transmission of the 8 bit binary number 10110010, by way of example, as the first binary number transmitted. When a "1" bit signal appears at encoder output 15, as depicted by the 1st bit in FIG. 3 and designated 40 therein, it opens gate 29 to pass frequency $f_1$ to the power amplifier and transducer, frequency $f_1$ being "ON" as indicated by this legend in FIG. 3. At this time the output from inverter 34 is negative and consequently, frequency $f_0$ is not passed by gate 30 and this condition for frequency $f_0$ is "Off" as depicted by this legend in FIG. 3. Likewise, there is no pulse either on voltage encoder output 12 or commutator output 13; hence gate 24 does not pass frequency $f_2$ which is thus "Off" as depicted by the legend in FIG. 3.

The second bit depicted in FIG. 3 is a "0" bit, the signal pulse from encoder output 15 being negative. Consequently, there is a positive pulse output from inverter 34 to thus open gate 30 and pass frequency $f_0$ as depicted at 41 in FIG. 3. The third and fourth bits in the code depicted in FIG. 3 are each "1" bits as indicated by the double width pulse 42 therein, and the fifth and sixth bits are each "0" bits as depicted at 43. The seventh bit is a "1" and the eighth bit is a "0" as depicted at 44 and 45 respectively.

At the termination of the 8th bit, a shift pulse is applied to commutator input 12 to shift the commutator to the next analog voltage input. This pulse, serving also as a channel shift pulse, is simultaneously applied to gate 24 to pass frequency $f_2$ to the power amplifier and transducer for transmittal of a channel "space" pulse as depicted at 46 in FIG. 3. In switching to the next sensor, a starting pulse is supplied to line 9 so that the encoder is set to convert the voltage being measured thereby to the second binary number.

The second binary number depicted in FIG. 3, by way of example, is 00001101 of which the first four "0" bits are depicted at 47, the fifth and sixth "1" bits are depicted at 48, the seventh "0" bit is depicted at 49, and the eighth "1" bit is depicted at 50. At the termination of this last bit of the second number or word, a second channel "space" transmittal occurs as depicted by the second pulse 46 at frequency $f_2$. The dashed lines following 50 and 59 indicate the rest of the channels.

When the analog voltages of all of the sensors S–1, S–2, . . ., S–N have been sampled and digitally converted to binary numbers, i.e., following the sampling and conversion of the analog voltage of sensor S—N, a final or recycling pulse from the matrix of commutator 10 appears at output 13 and persists thereon for 9 seconds. This pulse is applied to gate 24 to thus pass frequency $f_2$ for a period of 9 seconds as depicted at 51 in FIG. 3, thereby to transmit a recycle "space" pulse indicative of the completion of one complete cycle of sampling of the sensors S–1, S–2, . . ., S—N. It will be recalled that an encoder starting pulse is not supplied during the period of the recycle pulse, and the encoder, therefore, is not active at this time. Accordingly, frequency $f_2$ is transmitted alone at this time without the possibility of concurrent transmittal of either frequency $f_1$ or $f_0$.

Instead of using an analog commutator and a separate voltage encoder as illustrated in FIG. 1, the commutation and encoding might be accomplished in a single unit as described in my copending patent application Serial No. 652,969.

Figure 2:
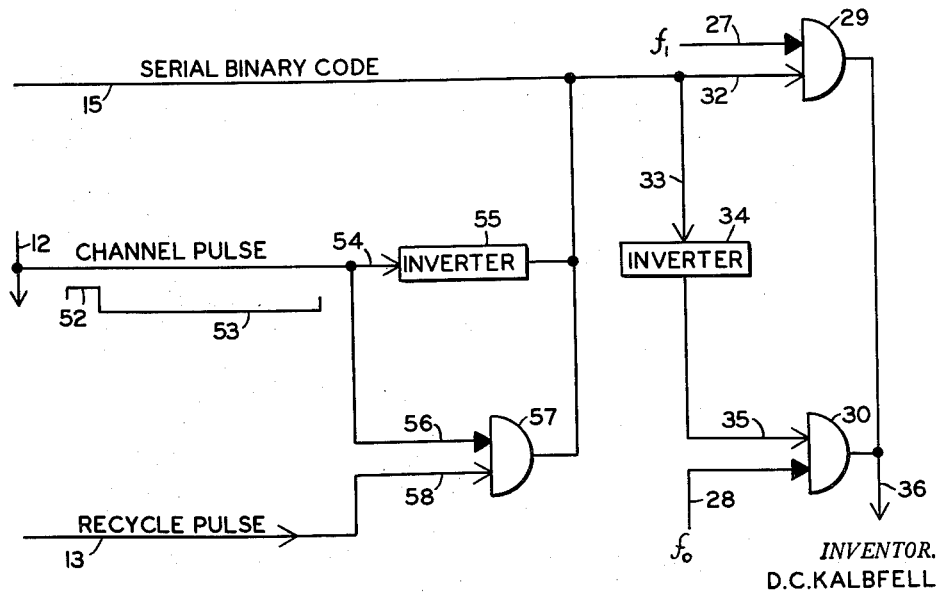
FIG. 2 illustrates a modification of a portion of the circuit of FIG. 1 wherein signal frequencies $f_1$ and $f_0$ may be used to provide "space" transmittals in lieu of frequency $f_2$.

In FIG. 2 there is shown a modification of the circuit of FIG. 1 by means of which the desired intelligence may be transmitted using only frequencies $f_0$ and $f_1$, these being made to serve additionally as the "space" frequencies. Like characters of reference are employed in FIGS. 1 and 2 to designate like parts and like circuit connections therein. The operation of FIG. 1 as modified by FIG. 2 is generally similar to that described for FIG. 1.

For the purposes of FIG. 2, the matrix in encoder 14 is constructed and arranged such that the channel shift pulse, which is also supplied to commutator input 12, comprises a positive pulse portion 52 of one second duration followed by a negative pulse portion 53 which persists for 9 seconds. It will be understood, as before, that a recycle pulse occurs only during each Nth occurrence of the channel shift pulses, N being the number of sensors employed and therefore the number of serially presented analog voltages as well as the number of binary numbers transmitted cyclically. On successive occurrences of pulse portions 52, the carrier matrix shifts to succeeding carrier windings and finally to the last position of the matrix to emit the recycle shift pulse.

The channel shift pulses are applied to the input 54 of an inverter 55 and also to the steady state input 56 of an "AND" gate 57, and the recycle shift pulses are applied to the pulse input 58 to open the gate. When pulse 52 appears at inverter input 54, a negative pulse is supplied by inverter 55 to input 32 of gate 29 and is ineffective to open the gate. The negative pulse from inverter 55 also appears at input 33 of inverter 34. Inverter 34, however, supplies a positive pulse to input 35 of gate 30 to open the gate and thus pass frequency $f_0$ for a period of one second as indicated at 60 in the pulse diagram of FIG. 4. In this figure, typical binary number and space transmittals are depicted which may occur in the operation of the system of FIG. 1 when modified in the manner disclosed in FIG. 2. The binary numbers illustrated are the same as those shown in FIG. 3. Gate 29 is closed during the period of pulse 60 and, accordingly, there is no transmittal of frequency $f_1$ at this time as indicated at 61 in FIG. 4.

When negative pulse 53 appears at input 54 of inverter 55, its positive counterpart appears at input 32 of gate 29 and thus opens the gate to pass frequency $f_1$ for an interval of 9 seconds as indicated by pulse 62 in FIG. 4. Negative pulse 53 is reproduced at input 35 of gate 30, but the gate is not opened thereby and, consequently, there is no transmittal at frequency $f_0$ during the interval of pulse 62 as depicted at 53 in FIG. 4.

When the recycle shift pulse appears at gate input 58, channel shift pulse 52 simultaneously appears at steady state input 56 of gate 57 and is passed by this gate to thus short circuit inverter 55. Pulse 52, therefore, appears at input 32 of gate 29 to thus open this gate and pass frequency $f_1$ as indicated by the one second transmittal pulse 64 in FIG. 4. Gate 30 is not opened by the negative counterpart of pulse 52 which is presented by inverter 34 and, consequently, frequency $f_0$ is not transmitted at this time as indicated at 65 in FIG. 4.

When the negative portion 53 of the channel shift pulse appears at steady state input 56 of gate 57, it is passed directly to inverter 34, inverter 55, as before, being short circuited by gate 57. The positive counterpart of negative pulse 53 is thus presented by inverter 34 to input 35 of gate 30 whereupon frequency $f_0$ is passed for a period of 9 seconds as indicated by pulse 66 in FIG. 4. Negative pulse 53 appearing at input 32 to gate 29, of course, is ineffective to open the gate and, accordingly, there is no transmittal at frequency $f_1$ during this period as indicated at 67 in FIG. 4.

From the foregoing it will thus be seen in the operation of the transmission system of FIG. 1, as modified by FIG. 2, that a channel "space" transmittal comprises a transmittal for one second at frequency $f_0$ followed by a transmittal for 9 seconds at frequency $f_1$. It will also be seen that a recycle "space" transmittal comprises a transmittal for one second at frequency $f_1$ followed by a transmittal for 9 seconds at frequency $f_0$. Since the longest series of either "1" or "0" bits in the assumed 8 bit code can only last for 8 seconds whereas the channel "space" and recycle "space" transmittals persist in this respect, i.e., either as continuous "1"s or "0"s, confusion is impossible.

In order to detect unambiguously a long pulse of the type used to indicate recycling or the end of a channel, as in the system modification of FIG. 2, the receiver employed with such a system will incorporate a counter or integrator which detects the presence of 9 continuous pulse periods of a single frequency. Each time that the frequency reverses, (switches from $f_0$ to $f_1$ or vice versa) the counter or integrator will be reset. This is the reason that the channel shift pulse starts with one second at one frequency followed by 9 seconds at the other frequency to insure that the counter or integrator will be reset regardless of the bit which immediately preceded this space marker.

The data collection and transmission systems thus far described, by reason of the provision of channel and recycle markers therein, provide adequate system reliability for use of automatic detection and control applications at the receiver, and these systems therefore are preferred.

It will be understood, however, that the data collection and transmission systems may be operated without any space markers as such. For example, the channel shift pulses may be eliminated and, in lieu thereof, a ring counter employed at the receiver to keep track of the channels in the same manner as in commercial decommutators for airborne telemetered data. To operate in this mode, FIG. 2 is modified as disclosed in FIG. 5 from which it may be seen that inverter 55 and gate 57 have been eliminated and line 13 connected directly to gate 29 at input 32 for direct application of the recycle shift pulse thereto. This connection, as disclosed, may be directly in parallel with line 15 which normally carries the serial binary code, or alternatively, the recycle shift pulse and the binary code pulses may be buffered into gate 29 through an "OR" gate. For this purpose, the recycle shift pulse has the same form 52, 53 illustrated for the channel shift pulse of FIG. 2, the last position of the commutator matrix being constructed and arranged as required to supply this pulse shape. The recycle shift pulse is applied to gate 30 in inverted form so that the recycle intelligence is a unique combination of frequencies $f_1$ and $f_0$ and thus eliminates all possibility of ambiguity, as aforedescribed. Inhibit line 9, heretofore described in connection with FIG. 1, prevents the serial binary code from being emitted at output 15 at the same time as the recycle shift pulse appears at output 13.

Figure 5:
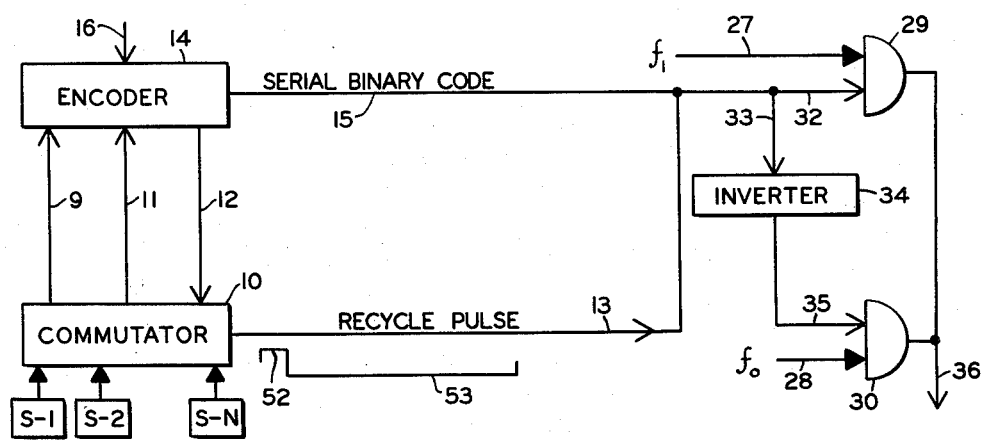
FIG. 5 illustrates a variation of the circuit arrangement of FIG. 2 suitable for elimination of "channel spaces" in a two frequency system.

The recycle shift pulses may also be eliminated in a still further system simplification in which lines 9 and 13 of FIG. 5 may be removed. In this case, the recycle point is indicated, for example, by connecting the last sensor S—N into the commutator at two points on the switching matrix so that its readings always apear twice at the receiver. Alternatively, the recycle point may be identified by use of one sensor input channel whose numerical reading is in a different range from that of the other channels. For example, one channel may simply indicate that a certain function is being performed, and this may be indicated by transmitting the maximum possible number such as a series of eight successive "1" bits.

The aforedescribed transmission system and method simplifications are satisfactory for presenting data for human analysis from typewritten results, but separate spacing markers are preferred in automatic control applications and where improved system reliability is required.

Figure 6:
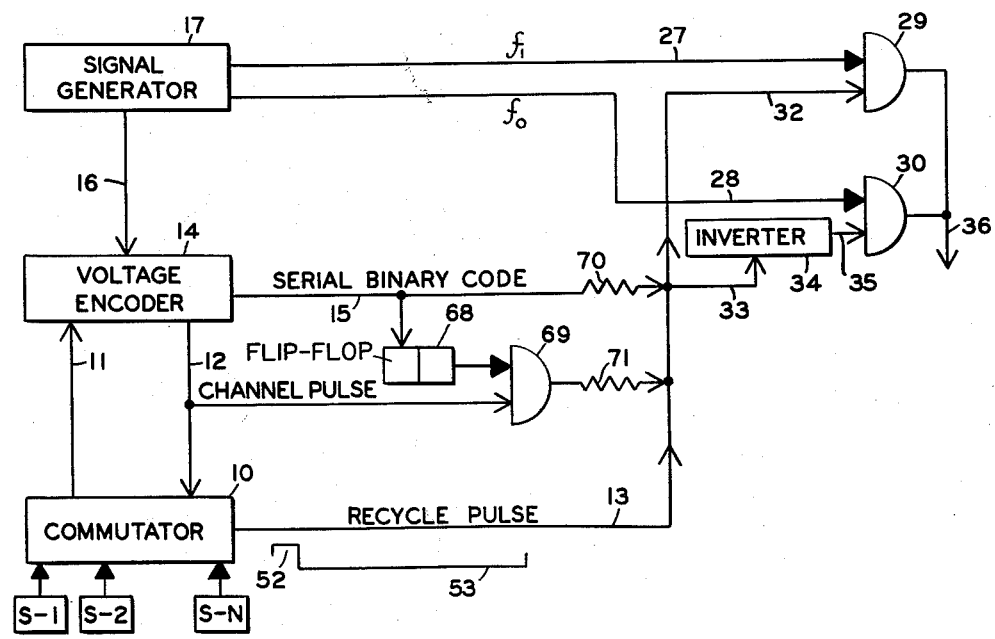
FIG. 6 illustrates in block diagram form an alternative embodiment of a two frequency system providing substantially the same intervals for channel and recycle spaces as obtained in the three frequency system of FIG. 1.

The two frequency data collection and transmission system as provided by the modification of FIG. 2 has the disadvantage of having approximately one half the rate or speed of information transfer obtainable from the three frequency system of FIG. 1, this being due principally to the long channel "space" markers which are inherent in the modification of FIG. 2. In FIG. 6, there is disclosed a circuit arrangement in a two frequency system in which the channel "space" markers have the same duration as those of FIG. 1. The frequency of the channel "space" transmittals, however, are either at frequency $f_1$ or frequency $f_0$ depending on the polarity of the binary pulse corresponding to the last bit in the binary number, the polarity of the "space" transmittal pulse being made opposite from that of the last binary pulse to thus indicate the channel spacing by the polarity reversals and resultant shifts in transmitted frequency.

This is accomplished in the circuit arrangement of FIG. 6 by the provision of a bi-stable "memory" flip-flop 68 whose input is connected to encoder output 15 and whose output is connected to the steady state input of an "AND" gate 69. Flip-flop 68 presents gate 69 with a voltage opposite in polarity to that of the binary pulses appearing on line 15, and thus, when the commutator shift pulse appears on line 12 and also at pulsed input of gate 69 to which it is connected, the gate is opened thereby and a pulse, having a polarity opposite to that of the binary pulse which appeared on line 15 just preceding the appearance of the channel shift pulse, is passed through gate 69 and thence to lines 32 and 33 to which the output of the gate is connected. If this pulse is positive, it opens gate 29 to pass frequency $f_1$ and, if negative, operates through inverter 34 to open gate 30 and pass frequency $f_0$.

As in the case of FIG. 5, the recycle shift pulse has the positive-negative pulse combination 52—53 for identification of recycle spacing. Inhibit line 9 is not employed, however, and in lieu thereof, suitable resistances 70 and 71 are inserted respectively in line 15 and the output of gate 69 to insure that any voltage appearing thereon during the recycle shift pulse, whether it be positive or negative, will be sufficiently attenuated with respect to the voltage of the recycle pulse as to be effectively cancelled thereby.

The operation of FIG. 6 will become more clearly apparent from the pulse diagram of FIG. 7 which shows the same binary numbers and generally the same channel and recycle spacing as illustrated in FIG. 3. It will be noted that the last bit in the first binary number depicted is a "0" and hence the transmittal is at frequency $f_0$ as indicated by pulse 45. Accordingly, gate 69 passes a reversed polarity or positive pulse corresponding to a "1" bit from flip-flop 68 which opens gate 29 to pass frequency $f_1$ as the channel "space" marker as indicated at 72 in FIG. 7.

In the next binary number, the last bit is a "1" and it therefore is transmitted at frequency $f_1$ as indicated at 50 in FIG. 4. The corresponding positive pulse on line 15 causes a negative pulse to be emitted from flip-flop 68 and this is passed by gate 69 as the gate is opened by the channel shift pulse which serially follows the appearance of the last bit pulse on line 15. The negative pulse from gate 69 is then presented by inverter 34 to gate 30 to open the same and pass frequency $f_0$ as the channel "space" marker as indicated at 73 in FIG. 7.

When all of the sensors have been sampled, the recycle shift pulse 52—53 is emitted from the commutator and, accordingly, the same combination of recycle "space" transmittals 64—66 as depicted in FIG. 4 are produced by the circuit of FIG. 6.

It will be noted that the pulse spacing of FIG. 7 differs from FIG. 3 only in that the 10 second recycle "space" pulse 64—66 for FIG. 7 is longer by 1 second than the 9 second pulse 51 of FIG. 3.

Although the figures generally show means for handling only sensors which develop an analog voltage output, the system of the present invention broadly comprises means for measuring subterranean parameters in the form of a series of binary numbers which, by means of pulse code modulation, causes sum and difference frequencies to be transmitted selectively in accordance with the "1's" and "0's" of the parameter measurements, the duration of each transmission frequency being quantized in units of the clock frequency. It is within the scope of the present invention therefore, to use a combination of such analog voltage sensors with others which may, for example, generate a frequency as in the case of the sensors manufactured by BJ Electronics, Santa Ana, California, or with sensors such as code wheels which generate a digital code directly. In the case of the frequency generating sensors, a preset counter type of circuit would be used instead of a voltage encoder, to generate the digital code. The commutator would then contain a switching matrix with enough positions to allow time for scanning these non-voltage generating sensors. Their digital codes would be converted to transmission frequencies in the same manner as for the voltage type sensors.

From the foregoing, it should now be apparent that a data collection and transmission system and method with exemplary embodiments and variations has been provided which is well adapted to fulfill the aforestated objects of the invention. It is to be understood, however, that the invention may be embodied in other forms or carried out in other ways without departing from the spirit or essential characteristics thereof. The embodiments of the invention hereinbefore disclosed therefore are to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A drill pipe module data collection and transmission system comprising, a plurality of sensors for producing analog voltages representing the measurement of parameters of interest in a well, means for converting said analog voltages to a series of corresponding binary numbers each comprising a series of "1" and "0" bit values, a drill pipe sonic transducer, and means for selectively driving said transducer at first and second frequencies corresponding to said binary values.

2. A drill pipe module data collection and transmission system comprising, a plurality of sensors for producing analog voltages representing the measurement of parameters of interest in a well, a commutator responsive to said analog voltages and having an output for presenting the same in serial form, analog-to-digital converter means connected to said commutator output for converting said serial voltages into a series of binary numbers each comprising a series of "1" and "0" bit values, a drill pipe sonic transducer, and means for selectively driving said transducer at first and second frequencies corersponding to said binary values.

3. A drill pipe module data collection and transmission system comprising, a drill pipe sonic transducer, means for generating a plurality of sonic frequencies, means for generating a plurality of analog voltages representing the measurement of parameters of interest in a well, means connected to said frequency and voltage generating means for converting said analog voltages to a recycling series of spaced binary numbers pulse modulated in units of one of said frequencies, each said binary number comprising a series of "1" and "0" bit values, and means responsive to said analog-to-digital converting means and connected to said frequency generating means for driving said transducer with predetermined ones of said frequencies one at a time and selectively in accordance with the "1" and "0" bit values of said numbers and the pulse characteristics of said spaces therebetween.

4. A pipe module data collection and transmission system comprising, in combination, means for measuring sequentially a plurality of subterranean parameters as a recycling series of binary numbers, a multi-frequency signal generator for generating related transmission and clock frequencies, a drill pipe sonic transducer, and pulse code modulation means responsive to said measuring means and to said signal generator for applying said transmission frequencies one at a time to said sonic transducer and selectively in accordance with "1" and "0" bit values of the parameter measurements, the duration of each transmission frequency being quantized in units of the clock frequency.

5. A pipe module data collection and transmission system comprising, in combination, means for measuring sequentially a plurality of subterranean parameters as a recycling series of binary numbers and having a unique space indication at the end of each cycle of numbers, a multi-frequency signal generator for generating related transmission and clock frequencies, a drill pipe sonic transducer, and pulse code modulation means responsive to said measuring means and to said signal generator for applying said transmission frequencies one at a time to said sonic transducer and selectively in accordance with "1" and "0" bit values of the parameter measurements and in accordance with the spaces between numbers and between cycles of numbers, the duration of each transmission frequency being quantized in units of the clock frequency.

6. A pipe module data collection and transmission system comprising, in combination, means for measuring sequentially a plurality of subterranean parameters and a recycle space marker signal as a recycling series of binary numbers, the binary number corresponding to said marker signal having a unique combination of "1" and/or "0" bit values for recycle identification, a multifrequency signal generator for generating related transmission and clock frequencies, a drill pipe sonic transducer, and pulse code modulation means connected to said generator and to said measuring means for applying said transmission frequencies to said sonic transducer selectively in accordance with the "1" and "0" bit values of said binary numbers and one at a time for intervals quantized in units of the clock frequency.

7. A pipe module data collection and transmission system comprising, in combination, means for measuring a plurality of subterranean parameters as a spaced recycling series of positive and negative pulses, said means including means for producing a recycle space marker pulse following each said series of pulses, said recycle pulse comprising a unique combination of positive and negative pulses, a multi-frequency signal generator for generating a clock frequency and related sum and difference transmission frequencies, a drill pipe sonic transducer, and pulse code modulation means connected to said measuring means and to said signal generator for applying either of said sum and difference frequencies to said transducer selectively in accordance with the occurrence of said positive and negative pulses and for intervals quantized in units of cycles of the clock frequency.

8. A pipe module data collection and transmission system comprising, in combination, a drill pipe sonic transducer, means for generating a clock frequency and sum and difference frequencies related thereto, a pair of filters for respectively passing said sum and difference frequencies, a pair of "AND" gates having outputs connected to said transducer and steady state inputs respectively connected to said filters, said gates having pulsed inputs for opening the gates and respectively passing said sum and difference frequencies to drive said transducer, means for sensing a plurality of subterranean parameters and producing measurements representative thereof, and means connected to said sensing means, said generating means, and said gates and operable under control of said clock frequency for converting and applying said measurements to said pulsed inputs in binary number form.

9. A pipe module data collection and transmission system comprising, in combination, a drill pipe sonic transducer, a multi-frequency signal generator, means for sensing a plurality of subterranean parameters and producing measurements representative of said parameters, encoder means connected to said sensing means and to said generator and operable under control of a clock frequency received from said generator for converting said measurements to a recycling series of spaced binary numbers comprising a series of positive and negative pulses representative of the bit and space characteristics of the binary numbers, and pulse code modulation means including gates connected to said generator and to said encoder means and responsive to said series of positive and negative pulses for driving said transducer from said signal generator at different transmission frequencies one at a time and selectively in accordance with said bit and space characteristics.

10. A pipe module data collection and transmission system comprising, in combination, a drill pipe sonic transducer, a pair of "AND" gates having the outputs thereof connected to said transducer and comprising a pair of steady state inputs having related sum and difference frequencies respectively applied thereto, said gates having pulsed inputs, an inverter connecting said pulsed inputs, means for sensing a plurality of subterranean parameters and producing measurements representative thereof, and means connected to said sensing means and to one of said pulsed inputs for converting and applying said measurements to said one of the inputs in a recycling series of spaced binary numbers.

11. A pipe module data collection and transmission system comprising, in combination, a drill pipe sonic transducer, a pair of "AND" gates having the outputs thereof connected to said transducer and comprising a pair of steady state inputs having related sum and difference frequencies respectively applied thereto, said gates having pulsed inputs, an inverter connecting said pulsed inputs, means for sensing a plurality of subterranean parameters and producing measurements representative thereof, commutator and encoder means each having a first output connected to the other and each having a second output connected to the pulsed input of one of said gates, means connecting said sensing means to said commutator means and including its first output for presenting said measurements in serial form to said encoder means, said commutator means having means including its second output for presenting a recycle pulse to said one of the gates following each said series of measurements presented to the encoder means, said encoder means having means including its second output for converting each of said serially presented measurements to a series of binary bits and presenting pulses corresponding to said bits to said one of the gates, and said encoder means having means including its first output for supplying a channel shift pulse to said commutator means following each said series of bits.

12. A system as in claim 11, said commutator means comprising a third output connecting said encoder means and a matrix connected to said first output of the encoder means and adapted to be shifted to successive positions by said channel shift pulse, said matrix having a position for commutating each of said measurements onto said first output of the commutator means and having a final position for emitting said recycle pulse onto the second output of the commutator means, and means including said third output and operatively connected to said matrix and to the converting means for initiating conversion of each of said measurements as the matrix is shifted into each position thereof except said final position.

13. A system as in claim 11, said recycle pulse having a predetermined shape simulating a series of positive and negative bit pulses and comprising a first bit pulse of polarity adapted to open said one of the first gates followed by a series of bit pulses of opposite polarity and adapted via said inverter to open the other of said gates, said series of opposite polarity pulses comprising more pulses than each said series of pulses corresponding to said measurements.

14. In a pipe module data collection and transmission system, the combination of a pair of "AND" gates having outputs connectable to a drill pipe sonic transducer and steady state inputs respectively having related sum and difference frequencies applied thereto, a first inverter, said gates having pulsed inputs connected respectively to the input and output of said inverter, said inverter input and the pulsed input of the one of said gates connected thereto having a serial binary code appearing thereon in the form of a recycling series of spaced binary numbers each comprising a series of positive and negative pulses for opening said gates directly and via said inverter respectively, a second inverter having an output connected to said input of the first inverter and having an input for receiving a channel shift pulse which follows each series of pulses comprising each said binary number, a third "AND" gate having an output connected to said output of the second inverter and a steady state input connected to its input, said third gate comprising a pulsed input having a recycle shift pulse appearing thereon which follows the series of pulses comprising the last of said binary numbers, said channel shift pulse comprising a predetermined series of positive and negative pulses of which the first pulse is of opposite polarity to the other pulses in the series and in which the number of said other pulses exceeds the number of pulses in each of said binary numbers, said recycle shift pulse comprising a series of positive pulses for opening said third gate and equal in number to the combined positive and negative pulses in said channel shift pulse whereby the channel shift pulse is passed by said third gate directly to said one of the gates during each occurrence of said recycle shift pulse, said second inverter being effectively shorted by said third gate when the same is open and effective to pass said channel pulse in inverted form directly to said one of the gates when said third gate is closed whereby said pair of gates pass one predetermined pattern of frequencies for the channel shift pulse and an inverted form of said pattern of frequencies for said recycle shift pulse.

15. In a pipe module transmission system, means including a pair of "AND" gates for passing one or the other of two different transmission frequencies selectively in accordance with the "1" and "0" bit values of a serial binary code received by one of the gates and comprising a recycling series of spaced binary numbers, means including an inverter connected to said one of the gates for applying a channel shift pulse to the gates, said channel shift pulse occurring during each space between said binary numbers and comprising a predetermined pattern of pulses adapted to open the other of the gates for a short interval and thereafter to open said one of the gates for a longer interval, said longer interval exceeding the time of transmittal for each binary number, and means including a third "AND" gate connected across said inverter for shorting the same and applying said pattern of pulses to said pair of gates in inverted form in response to a recycle pulse received by said third gate whereby said one of the gates is opened for said short interval and said other of the gates is opened for said longer interval, said recycle pulse occurring during each space between successive cycles of said binary numbers and having a pulse duration equal to that of said channel shift pulse.

16. In a pipe module transmission system, means including a pair of "AND" gates for passing one or the other of two different transmission frequencies selectively in accordance with positive and negative pulses received by one of the gates and respectively representing the "1" and "0" bit values of a serial binary code comprising a recycling series of spaced binary numbers, means including a third "AND" gate for applying a channel shift pulse to said one of the gates following the last of the pulses representing each of said binary numbers, said channel shift pulse being similar to said code pulses and opposite in polarity to the last code pulse in the preceding number, said one of the gates also having a recycle pulse applied thereto following the last of the pulses which represent the last of said binary numbers, said recycle pulse comprising a first pulse portion similar to a code pulse of one polarity followed by a pulse portion of opposite polarity, said following pulse portion having a duration exceeding the combined duration of the pulses representing any one of said binary numbers.

17. In a drill pipe module transmission system, means including a pair of "AND" gates having related sum and difference transmission frequencies applied to the steady state inputs of said gates for passing one or the other of said frequencies selectively in accordance with positive and negative pulses received by the pulsed input of one of the gates and respectively representative of the "1" and "0" bit values of a serial pulse modulated binary code comprising a recycling series of spaced binary numbers, a third "AND" gate having the output therof connected to said pulsed input of said one of the gates, said third gate having a shift pulse appearing on the pulsed input thereof, said shift pulse being similar to a positive code pulse and appearing on said third gate input following the last of the pulses representative of each of said binary numbers, and means for applying and holding said code pulses with inverted polarity on the steady state input of said third gate whereby said inverted polarity pulses serve as channel shift pulses and are passed to said one of the gates during said appearance of said shift pulse on said pulsed input of the third gate, said pulsed input of said one of the gates also having a recycle pulse appearing thereon following the last of the code pulses which represent the last of said binary numbers, said recycle pulse comprising a first pulse portion similar to a code pulse of one polarity followed by a pulse portion of opposite polarity, said following pulse portion having a duration greater than the combined duration of the pulses representing any one of said binary numbers.

18. In a transmission system as in claim 17, said means for applying and holding said code pulses with inverted polarity on the steady state input of said third gate comprising a bi-stable "memory" flip-flop having an input for receiving said code pulses and an output connected to said steady state input of the third gate, said output of the flip-flop being driven by said pulses appearing on its input to produce pulses opposite in polarity thereto.

19. In a transmission system as in claim 18, further comprising a signal generator for generating a clock frequency and said sum and difference frequencies therefrom; a voltage encoder having an input connected to said signal generator, a first output for emitting said code pulses and connected to the pulsed input of said one of the gates and to the input of said flip-flop, and a second output for emitting said shift pulse and connected to the pulsed input of said third gate: the duration of said code and shift pulses being set by said clock frequency; a plurality of sensors for producing analog voltages representative of parameters of interest in a well; and a commutator connected to said sensors and to said voltage encoder and adapted to present said analog voltages to the encoder in serial form; said encoder having means for converting said series of analog voltages to said serial binary code; said commutator having means including a matrix connected to said second output of the encoder for switching the matrix to successive positions on each occurrence of said shift pulse, said matrix having a plurality of positions in which said analog voltages are presented in successive order to said encoder and a final position in which said recycle pulse is presented to said one of the gates.

20. In a transmission system as in claim 19 and further comprising means for attenuating said code and channel space pulses relative to said recycle pulse such that said pair of gates are opened only in response to the recycle pulse during occurrence thereof.

21. In a data collection and transmission system of the character disclosed, a drill pipe module sonic transducer; first, second, and third "AND" gates having their outputs connected to said transducer and having first, second, and third transmission frequencies applied respectively to their steady state inputs; an inverter connected between the pulsed inputs of the first and second gates; a voltage encoder having first and second outputs respectively connected to the pulsed inputs of the second and third gates, a first input for receiving a clock frequency, a second input for receiving a voltage to be encoded thereby, and a third input for receiving a pulse for starting the voltage encoding; a plurality of sensors for respectively producing analog voltages representative of parameters measured thereby; and a commutator connected to said sensors, to said second encoder output, and to said second and third encoder inputs and having an output connected to the pulsed input of said third gate; said commutator having means responsive to a channel shift pulse received on said second encoder output for commutating said analog voltages one at a time and as a series onto said second encoder input, simultaneously with the commutation of each of said series of voltages, supplying a starter pulse to said third encoder input, and following commutation of the last analog voltage of said series, supplying a recycle shift pulse to said encoder output; said encoder having means for applying to said first encoder output a serial binary code pulse modulated in units of said clock frequency and representative of said series of analog voltages and following encoding of each of said series of analog voltages, emitting said channel shift pulse onto said second encoder output.

22. In a data collection and transmission system as in claim 21, a signal generator including oscillators for respectively generating the third transmission frequency and said clock frequency, a balanced modulator for heterodyning said third and clock frequencies to produce therefrom said first and second frequencies as sum and difference frequencies, and first and second filters for respectively passing said first and second frequencies.

References Cited in the file of this patent

UNITED STATES PATENTS

| | | |
|---|---|---|
| 2,436,563 | Frosch | Feb. 24, 1948 |
| 2,810,546 | Eaton | Oct. 22, 1957 |